United States Patent

[11] 3,619,098

| [72] | Inventor | Theodore F. Bolles |
|------|----------|--------------------|
|      |          | Woodbury, Minn. |
| [21] | Appl. No. | 873,198 |
| [22] | Filed | Nov. 3, 1969 |
| [45] | Patented | Nov. 9, 1971 |
| [73] | Assignee | Minnesota Mining and Manufacturing Company |
|      |          | St. Paul, Minn. |

[54] PHOTOFLASH UNIT
5 Claims, 6 Drawing Figs.

[52] U.S. Cl.................................................. 431/95,
136/90, 136/112
[51] Int. Cl................................................. F21k 5/02
[50] Field of Search.......................................... 431/93–95;
136/112–114, 90–92

[56] References Cited
UNITED STATES PATENTS

| 618,057 | 1/1899 | Crowdus ..................... | 136/114 X |
| 2,723,549 | 11/1955 | Martin......................... | 431/93 |
| 3,310,967 | 3/1967 | Toomey, Jr. et al. ......... | 431/93 |
| 3,319,058 | 5/1967 | Toomey, Jr. et al. ......... | 240/1.3 |

*Primary Examiner*—Edward J. Michael
*Attorney*—Kinney, Alexander, Sell, Steldt & Delahunt ABSTRACT: A disposable photoflash unit containing a reserve cell as a source of energy for ignition. The aqueous electrolyte of the reserve cell is contained in a multiplicity of small capsules and the cell is activated by rupturing a substantial portion of the capsules thereby releasing the electrolyte.

PATENTED NOV 9 1971 3,619,098
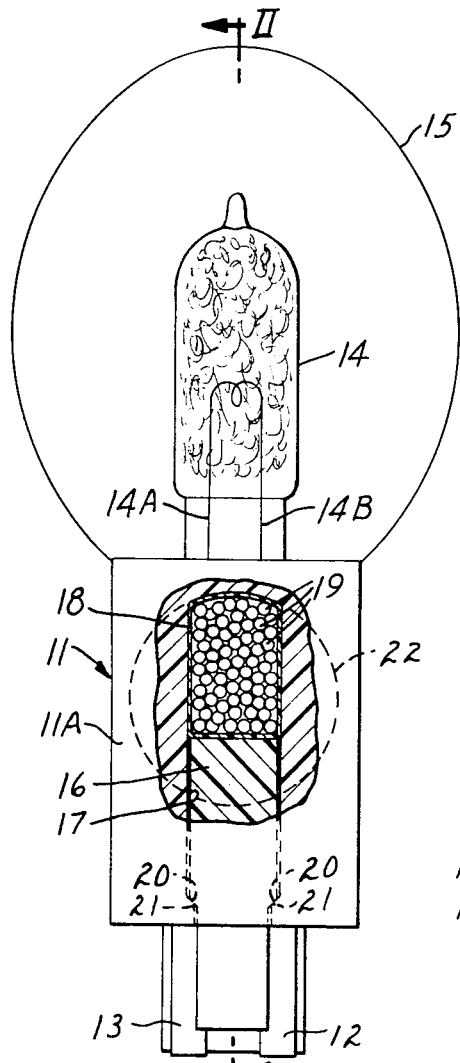
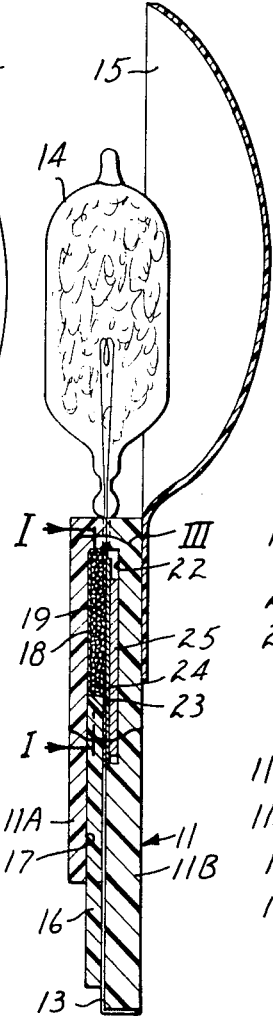
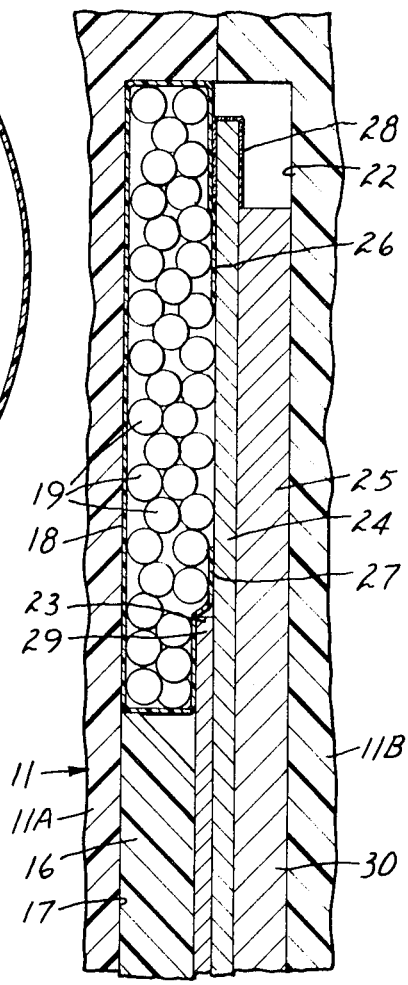
FIG.1  FIG.2  FIG.3
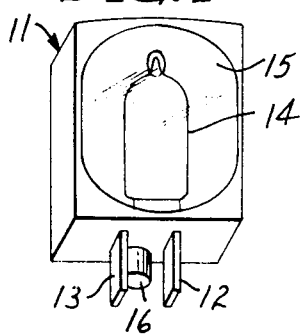
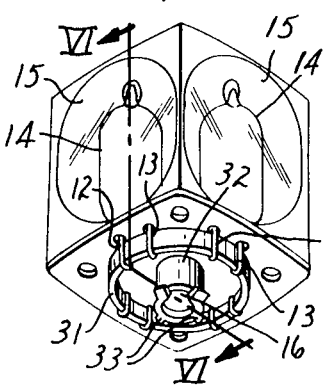
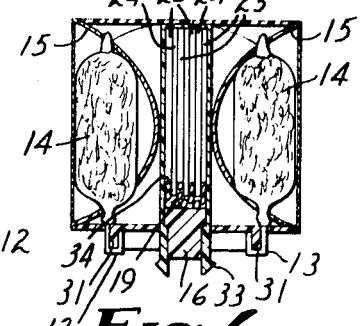
FIG.4  FIG.5  FIG.6
INVENTOR.
THEODORE F. BOLLES
BY Kinney, Alexander,
Sell, Steldt & DeLa Hunt
ATTORNEYS

3,619,098

PHOTOFLASH UNIT

BACKGROUND OF THE INVENTION

The present invention relates to a disposable photoflash unit which contains a reserve cell as a source of energy for its ignition.

Electrical current to ignite the conventional photoflash bulb is provided by an external source of energy. Ordinarily, two or more primary cells are employed for this purpose (such as the well-known zinc-carbon flashlight battery) which are mounted in a separate flashgun or within the case of the camera with which the bulb is to be used. In these primary cells the components are in electrochemical contact from the time of manufacture. Consequently, deterioration begins with manufacture and shelf like is definitely limited, regardless of whether or not the cell is used. Polarization, internal resistance and other internal effects greatly reduce the voltage delivered by and the energy density of such cells. If higher energy electrochemical systems are utilized to increase voltage and current output, much shorter shelf like results. Primary cells with moderate shelf life (such as the zinc-carbon type) have sufficiently low voltage and amperage outputs that two or more are generally required to operate flashbulbs, due largely to contact resistances in the circuit. The deterioration of the primary cells often results not only in failure to provide the necessary electrical energy to fire a flashbulb when needed, but also in leakage of the electrochemical deterioration products with consequent corrosion and damaging of the camera or flash gun.

Flashbulbs having self-contained primary cells mounted therein have also been suggested, e.g., see U.S. Pat. Nos. 3,310,967 and 3,319,058. In practice, however, all primary cell ignition systems have the innate disadvantages of limited shelf life and requirement of two or more primary cells to assure ignition of the flashbulb. Furthermore, there is no way of ascertaining whether electrochemical deterioration has proceeded to the point where the bulb will not fire other than by firing the bulb. If the cells have deteriorated, the entire bulb in the case of U.S. Pat. Nos. 3,310,967 and 3,319,058 must be discarded and the film is wasted.

In reserve cells, electrochemical action is initiated when desired, such as by releasing electrolyte to contact the electrodes thereof. Although reserve cells generally have short active lives, they have (at least in theory) indefinite shelf lives. The foregoing disadvantages of the primary cell are thus obviated. The use of flashbulbs containing reserve cells have, in fact, been suggested. Thus, U.S. Patent No. 2,723,549 discloses a flashbulb containing a reserve cell in its base. The electrolyte is contained under pressure in an annular or helical tank of glass or a similar frangible material and the cell is activated by smashing the tank by pressure from a stud which extends from the base of the flashbulb.

While overcoming the major disadvantages of flash bulbs containing primary cells, the bulbs of U.S. Pat. No. 2,723,549 themselves have serious practical drawbacks. They would be difficult and expensive to manufacture (including as they do a small fragile tank of complex shape containing electrolyte under pressure). This would set the cost of their manufacture beyond the price they could command on the market. Miniaturization of these bulbs would be difficult or impossible. Also, the brittle and fragile tank would be very easily broken by accident in handling or during storage, thus prematurely activating the reserve cell. In such case, it would be quickly (probably within a few hours) incapable of delivering the desired electrical current at the time of its intended use. This likelihood of accidental activation is, in fact, indicated in U.S. Pat. No. 2,723,549 at column 3, lines 59 and following, where provisions are made for detecting whether the cell has already been accidentally activated and exhausted.

Thus, none of the foregoing are actually satisfactory. A low-cost, disposable photoflash unit is desired which can be easily mass-produced at low cost, stored indefinitely and conveniently handled with no loss of dependability. Such units should be capable of being made to fill every type of flash bulb requirements, in small size and lightweight.

The photoflash units of the present invention readily satisfy these requirements. They can be easily mass-produced (using simple low-cost sheet materials if desired), stored indefinitely and handled roughly with essentially no chance of accidental activation. They can easily be miniaturized. They can be easily activated when desired and used, then disposed of. Since they are powered by reserve cells, less stable electrochemical systems capable of high voltage and amperage outputs can be used, i.e., a single cell generates sufficient voltage and amperage to fire a flashbulb and sufficient overall capacity to fire several such bulbs. This latter feature becomes important, as will be shown, in multiple bulb units such as flash cubes.

DESCRIPTION OF THE INVENTION

The photoflash bulbs of the present invention contain a source of energy for their ignition. They comprise an envelope composed at least partially of a light-transmitting material, a light-releasing substance enclosed by said envelope and adapted to be ignited electrically to release actinic light, an electrochemical reserve cell, externally operable means for activating the reserve cell and externally operable means to cause an electrical current from the activated cell to ignite the light-releasing substance (such as a switch which is synchronized with a camera shutter). The reserve cell comprises a casing containing a cathode, an anode, a separator therebetween and a multiplicity of capsules ranging in diameter substantially from 300 to 4,000 microns which are filled with an aqueous electrolyte and which have shells composed of a material which melts between 40° and 110° C. and which is immiscible in the aqueous electrolyte when both are in the liquid form. The reserve cell is activated by rupture of a substantial portion of the capsules and consequent release of electrolyte.

Referring now to the drawings wherein:

FIG. 1 is a partially sectioned front view of a preferred embodiment of the present invention.

FIG. 2 is a sectional side view taken on line II—II of FIG. 1.

FIG. 3 is an enlarged view of the sectioned portion III of FIG. 2.

FIG. 4 is a perspective view of another embodiment of the invention.

FIG. 5 is a perspective view of still another embodiment of the invention.

FIG. 6 is a vertical view taken on line VI—VI of FIG. 5.

In FIG. 1, 11 denotes a casing which is preferably of a plastic material, such as polyethylene, two camera contacts 12 and 13, a flashbulb 14 having bulb leads 14A and 14B, a reflector 15 and a plunger 16 (conveniently also of a plastic material such as polyethylene) which is used to activate the reserve cell of the photoflash unit. In the partial sectional view (taken on line I—I of FIG. 2) 17 denotes a channel in the casing 11. In the end of channel 17 is a thin flexible plastic pouch 18 containing capsules 19 having aqueous electrolyte fill. The only opening of the pouch is sealed to a separator in the electrochemical reserve cell of the unit. When plunger 16, shown in section in the partial sectional view, is pressed upward, pouch 18 is collapsed and capsules 19 are ruptured. The electrolyte is thereby released to the separator which, as will be shown, immediately activates the reserve cell. The reserve cell is in series between contact 13 and bulb lead 14A. Contact 12 and bulb lead 14B are connected directly. A short across contacts 12 and 13, usually in synchronization with a camera shutter, will thus fire flashbulb 14.

The plunger is desirably pressed upward automatically (thereby activating the reserve cell) when the unit is plugged into a camera, i.e., by pressure of the camera body against the bottom of the plunger. The shoulders 20 on the plunger and the bumpers 21 on the casing are provided to prevent withdrawal of the plunger past the approximate position shown.

In FIG. 2, the casing 11 is shown to consist of a front portion 11A which contains channel 17 in which plunger 16, pouch 18 and capsules 19 are held and a rear portion 11B which contains the internal cavity 22, shown by dotted line in FIG. 1. This cavity is usually larger in area than channel 17 but may not be as deep. It contains the remaining portions of the reserve cell, as more easily seen in FIG. 3, which is an enlarged view of the portion of FIG. 2 defined by line III.

In FIG. 3, 11A, 11B, 16, 17, 18, 19 and 22 are as previously described and 23–25 are electrochemical elements of the reserve cell, conveniently in sheet form. These include an anode 23, a nonconducting porous separator 24 (e.g., of a suitable paper, other nonwoven webbing, porous plastic sheeting or a similar material) and a cathode 25. Pouch 18 is sealed, by means of an adhesive, for example, to the separator 24 around the edges of the opening therein (locations 26 and 27 in the figure). When the capsules are crushed, the electrolyte therein thus comes into contact with the separator which carries it, by means of a wicking action to the entire surfaces of the electrodes facing it. The edges of the separator can be treated with a water-insoluble binder or other suitable substance to prevent loss of the electrolyte (see 28 in the figure). As noted previously, the cell is connected in series between a camera contact 13 and a bulb lead 14A (refer to 29 and 30 in FIG. 3).

The following are some examples of electrochemical systems suitable for use in the photoflash units of the present invention together with the approximate voltages generated.

| Anode | Zinc |
|---|---|
| Cathode | $PbO_2$ |
| Electrolyte | Aqueous $H_2SO_4$ |
| Voltage | 2.4 |

| Anode | Zinc |
|---|---|
| Cathode | $MnO_2$ |
| Electrolyte | Aqueous $NH_4Cl$, $ZnCl$ |
| Voltage | 1.5 |

| Anode | Zinc |
|---|---|
| Cathode | $MnO_2 + NH_4Cl$, $ZnCl$ |
| Electrolyte Solvent | $H_2O$ |
| Voltage | 1.5 |

| Anode | Zinc |
|---|---|
| Cathode | $Ag_2O$ |
| Electrolyte | Aqueous KOH Solution |
| Voltage | 1.9 |

| Anode | Lead |
|---|---|
| Cathode | $PbO_2$ |
| Electrolyte | Aqueous Sulfuric Acid |
| Voltage | 2.0 |

| Anode | Magnesium |
|---|---|
| Cathode | AgCl |
| Electrolyte | $H_2O$ or Aqueous NaCl Solution |
| Voltage | 1.6 |

| Anode | Zinc |
|---|---|
| Cathode | HgO |
| Electrolyte | 40% Aqueous KOH Solution |
| Voltage | 1.3 |

These are illustrative only and many other known systems can be used instead. The metal anodes can be woven screen wire, solid or perforated metal foil or sheeting, vapor-deposited metals, plated metals (such as galvanized steel), etc.

A preferred electrochemical system herein is the zinc-lead dioxide-aqueous sulfuric acid system. Such a cell can be quite small (due to high voltage and amperage), is composed of available and inexpensive material and is easily manufactured. Finely divided lead dioxide is advantageously used to obtain high-current density. A suitable lead dioxide cathode can be prepared by overcoating a chemically inert conductor sheet (which acts as a current collector) with finely divided lead dioxide in a water-soluble binder, such as polyvinyl alcohol. The chemically inert conductor can be prepared on a polymeric film base, e.g., a polyester such as polyethylene terephthalate, by first applying a metal layer thereto (such as by vapor deposition or by lamination of a foil) then coating the metal layer with finely divided carbon, such as acetylene black or graphite, in a water-insoluble binder, such as a styrene-butadiene copolymer. In such a cell the aqueous electrolyte contacts the lead dioxide particles in the water-soluble layer as soon as it is released from the capsules but does not readily penetrate the adjacent water-insoluble binder. Such a cell furnishing a total charge of 26 ampseconds requires only about 26.4 milligrams of $H_2SO_4$ (258 milligrams of 1 molar aqueous solution), 30 milligrams of $PbO_2$ and 8 milligrams of zinc.

The electrolytes suitable for use in he present invention are generally aqueous in order to generate useful voltages. Aqueous fills are quite difficult to encapsulate, although it has been found that they can be prepared by the process disclosed in U.S. Pat. No. X 3,423,489 (Arens et al.) Preferably these are in about the 300–3,000 micron range, for reasons of ease of capsule preparation and use. As previously stated, the capsule shells should be composed of a material which melts between 40° and 110° C. and which is immiscible in the aqueous electrolyte fill when both are in the liquid form. These restrictions relate to the process of encapsulation (U.S. Pat. No. 3,423,489). Among the encapsulating materials are waxes, fats, proteins, carbohydrates, gellable colloid materials such as gelatin and agar-agar, low polymers, and the like. Specific encapsulating materials include paraffin waxes having melting points of 48° C., 55° C. and 83° C., microcrystalline waxes, etc. These can be used alone or together with other waxes and materials. A useful encapsulating composition is the following (the parts being given by weight):

| | Parts |
|---|---|
| Paraffin wax, M.P. 55° C. | 44.95 |
| Paraffin wax, M.P. 83° C. | 44.95 |
| Copolymer of ethylene and ethyl acrylate (commercially available under the designation "Dow EA-2018" | 10.0 |
| Butylated hydroxy toluene antioxidant | 0.1 |

Capsules as described herein are essentially impossible to fracture by jarring but are easily broken by compression or by heat.

In the embodiment shown in FIG. 4 the bulb 14, the reflector 15 and the reserve cell are contained inside the casing 11, which is in the form of a small cube, the cell being located behind the reflector. The contacts 12 and 13 are in the form of prongs for insertion in a receptacle on a camera or on a switching device other than a camera. The plunger is automatically depressed and the reserve cell activated when the unit is plugged into the receptacle.

FIG. 5 illustrates a unit of the present invention in the form of a flash cube. Shown are the contacts 12 and 13 for each bulb in the form of wires passing over the contact ring 31, bulbs 14 and reflectors 15. The center post 32 and the four engagement lugs 33 are arranged as in conventional flash cubes. Plunger 16 is slightly recessed inside center post 32 and is depressed to activate the reserve cell by a complementary projection on the camera when the cube is to be used.

In FIG. 6 a cross section through the central axis of the article of FIG. 5, the location of the reserve cell is shown. The numbers designate the same elements as the previous drawings. The transverse structural member 34 contains a number of holes sufficiently small to prevent passage of capsules or shells of crushed capsules but permitting passage of the liquid electrolyte. The capsules are thus crushed between the plunger 16 and the member 34 to activate the reserve cell. In the cell shown, there are two anodes 23 and two cathodes 25, the electrodes being alternated with separators 24. The ends of the separators pass through openings in member 34 and electrolyte is thus carried to all portions of the electrodes by capillary action. The additional electrodes are provided for increased capacity and still more could be provided, if desired. Alternatively, the electrodes and separator could be helically wound. If a multiplicity of separate anodes are provided, they are connected by an electrical conductor. The same is true of the cathodes.

No pouch (18 in FIG. 3) is provided and may not be required if relatively lose tolerances are observed and/or if surface tension forces tend to obviate leakage.

The wiring, not shown, is analogous to the previously described. Each of the four bulbs is placed in series with the reserve cell and is fired by shorting the connecting wires 12 and 13 associated with it.

Alternatively, a flash cube could be provided with four separate cells, one being connected to each bulb. This would avoid any limitation in the time between the firing of the various bulbs. Also, a multiplicity of cells (e.g., two) could be provided in the cube, each cell being connected to all four bulbs. Thus, one cell could be activated and some of the bulbs fired. At any time thereafter another cell could be activated and additional bulbs fired.

The multiple bulb units of the invention need not, of course, be cubes having four bulbs. Multiple bulb and multiple cell units having various numbers of bulbs and cells also fall within the purview of the invention as do various units in which each bulb is connected to one or more cells as disclosed above.

What is claimed is:

1. A disposable photoflash unit containing a source of energy for its ignition comprising an envelope composed at least partially of a light-transmitting material, a light-releasing substance enclosed by said envelope and adapted to be ignited electrically to release actinic light, an electrochemical reserve cell, externally operable means for activating the reserve cell and externally operable means to cause an electrical current from the activated cell to ignite the light-releasing substance, the reserve cell comprising a casing containing a cathode, an anode, a separator therebetween and a multiplicity of capsules ranging in diameter substantially from 300 to 4,000 microns which are filled with an aqueous electrolyte and which have shells composed of a material which melts between 40° and 110° C. and which is immiscible in the aqueous electrolyte when both are in the liquid form, the reserve cell being activated by rupture of a substantial proportion of the capsules and consequent release of electrolyte.

2. A photoflash unit according to claim 1 in which the capsules range in diameter from about 300 to 3,000 microns.

3. A photoflash unit according to claim 1 wherein the anode is zinc and the cathode is silver oxide.

4. A photoflash unit according to claim 1 wherein the anode is lead and the cathode is lead dioxide.

5. A disposable photoflash unit containing a source of energy for its ignition comprising an envelope composed at least partially of a light-transmitting material, a light-releasing substance enclosed by said envelope and adapted to be ignited electrically to release actinic light, an electrochemical reserve cell, externally operable means for activating the reserve cell and externally operable means to cause an electrical current from the activated cell to ignite the light-releasing substance, the reserve cell comprising a casing containing a lead dioxide cathode, a zinc anode, a separator therebetween, a multiplicity of capsules ranging in diameter substantially from 300 to 3,000 microns filled with aqueous sulfuric acid electrolyte which have shells composed of a material which melts in the range of 40° to 110° C. and which is immiscible in the aqueous electrolyte when both are in the liquid form, the reserve cell being activated by rupture of a substantial proportion of the capsules and consequent release of electrolyte.

* * * * *